March 12, 1968 L. A. SMITZER 3,373,265

INFORMATION STORAGE AND RETRIEVAL PROCESS AND CODED RECORD CARD THEREFOR

Filed Dec. 12, 1962 2 Sheets-Sheet 1

INVENTOR.
Louis A. Smitzer

BY

Hill, Sherman, Meroni, Gross & Simpson

ATTORNEYS

March 12, 1968 L. A. SMITZER 3,373,265

INFORMATION STORAGE AND RETRIEVAL PROCESS AND CODED RECORD CARD THEREFOR

Filed Dec. 12, 1962 2 Sheets-Sheet 2

INVENTOR.

Louis A. Smitzer

BY

Hill, Sherman, Meroni, Gross & Simpson

ATTORNEYS

United States Patent Office 3,373,265

Patented Mar. 12, 1968

3,373,265

INFORMATION STORAGE AND RETRIEVAL PROCESS AND CODED RECORD CARD THEREFOR

Louis A. Smitzer, Chicago, Ill., assignor to Bell & Howell Company, Chicago, Ill., a corporation of Illinois Filed Dec. 12, 1962, Ser. No. 244,138
6 Claims. (Cl. 235—61.12)

This invention relates generally to information storage and retrieval processes and more specifically relates to a coded record card of the type which is adapted to be processed at high speed through various automatic machines as a part of a card classification system.

Punched card business machines heretofore provided are based on the principle of using holes punched into small cards to indicate letters and numbers. The cards are processed at high speed through various automatic machines which are capable of classifying, filing, collating, adding, subtracting, multiplying, dividing, totaling, reproducing, printing and posting data punched into the cards. Many phases of accounting and statistical work can be handled on this type of equipment. Further, because of the necessity and desirability of businesses keeping many records stored in the smallest amount of space so that they are easily at hand, the use of cards for carrying microimages has been effected.

In accordance with the concepts of the present invention, an information storage and retrieval system is provided by the utilization of a unitized tab card having plural independent discrete image zones disposed in multiple columns extending vertically and in multiple rows extending horizontally. The card of the present invention is also particularly characterized by the utilization of plural identifiable positions forming intelligence means or "yes-no" means such as spots or pigmented areas or punch positions adjoining each column of image zones for effecting horizontal coding of the respective image zones and further including identifiable positions adjoining each row of image zones for effecting vertical coding of the respective image zones. Space is also provided on the card which may be devoted to intelligence coded information, for example, for purposes of general identification.

It is an object of the present invention, therefore, to provide a method of storing information on an accounting machine card wherein separate images may be added to the card in sequenced groups and the individual images may be intelligence coded within the card.

Yet another object of the present invention is to provide an accounting machine card having a coding area thereon and further including independently of such coding area plural separate localized images in sequenced groups separated by intelligence stations for coding each individual image separately.

A further object of the present invention is to provide a method of cumulatively storing information on an accounting machine card which includes the steps of adding separate images to a card in localized discrete image zones disposed in vertical columns and horizontal rows.

A still further object of the present invention is to provide a tabulating card wherein information may be stored cumulatively by means of separate images disposed in localized discrete image zones arranged in vertical columns and horizontal rows wherein the image zones are separated by intelligence stations so that the individual images may be coded independently and separately.

Many other features, advantages and additional objects of the present invention will become manifest to those versed in the art upon making reference to the detailed description which follows and the accompanying sheets of drawings in which a preferred embodiment of a coded record card is described in detail by way of illustrative example and by means of which the method concepts of the present invention may be practiced.

Figure 1:
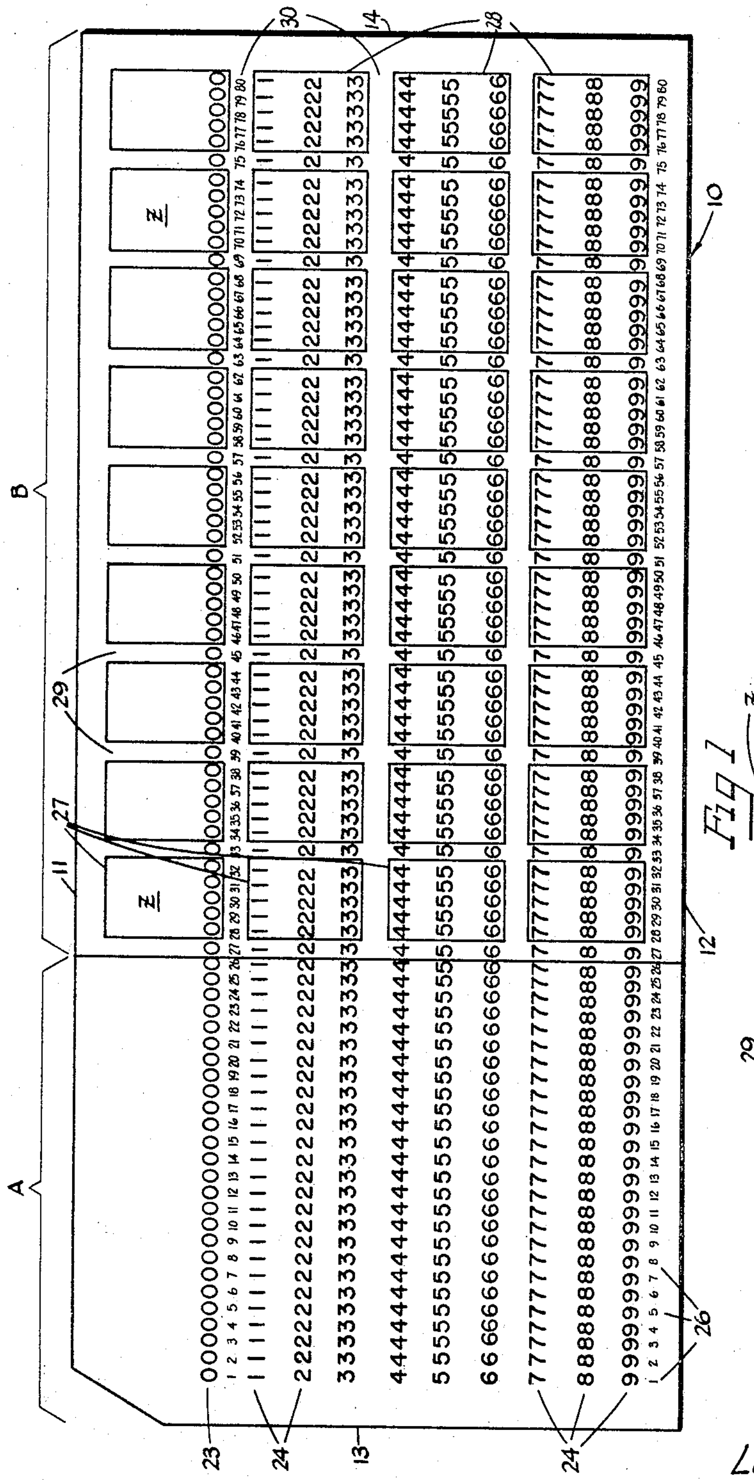
FIGURE 1 is a master for use in providing a coded record card in accordance with the principles of the present invention.

Referring, first of all, to FIGURE 1, there is shown a master form indicated generally at 10 and from which the physical arrangements of the coded record card of the present invention may be determined.

The master form 10, like the record cards made in connection therewith, is a generally rectangular sheet form member having a major longitudinal dimension through which extends an upper edge 11 and a lower edge 12 and a minor dimension through which extends a side edge 13 and a side edge 14.

The card is divided along the length of its major longitudinal dimension into a minor area indicated at A and a major area indicated at B. It is contemplated by the invention that the major and minor areas could be placed selectively, for example, with the minor area at the center of the card and the major area on different sides thereof. In any event, the minor area A is intended to be devoted to intelligence information of a general identification character, whether punched or otherwise coded, while the major area B, in accordance with the principles of the present invention, is adapted to receive document information in the form of plural images in sequenced groups disposed in vertical columns and horizontal rows and separated by identifiable stations forming intelligence means or yes-no means or some other sensible coding signals.

Figure 2:
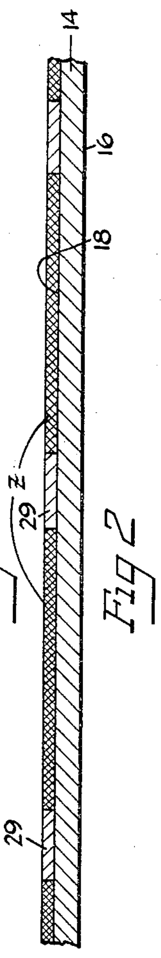
FIGURE 2 is a fragmentary cross-section of a coded record card having a base material plus a separate pressure-sensitive coating receptive to the formation and retention of plural images thereon.

Although the principles of the present invention are applicable to an opaque card, it is specifically contemplated by the present invention to provide a card made of a transparent base material such as a self-supporting film. Further, it is contemplated that the transparent film-type card is constructed of such a material as to be pressure-sensitive, at least on one face thereof. Characteristics of pressure-sensitivity can be effected on the film base either by formation thereon of a separate coating, or by proper selection of the base material of the film. Thus, there is shown in FIGURE 2 a transparent film base 14 having flat parallel faces 16 and 18. A transparent film coating 19 having pressure-sensitive characteristics is placed on the face 18 of the transparent film base 14.

Figure 3:
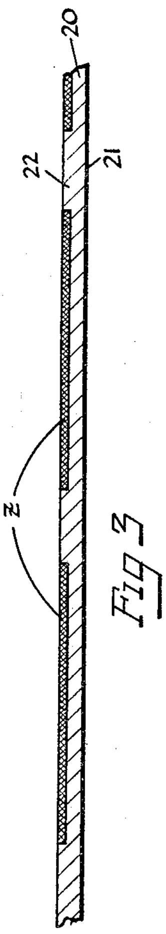
FIGURE 3 is a cross-sectional view similar to FIGURE 2 but showing an alternative form of record card construction wherein the images are formed directly in one surface of the card base material.

In FIGURE 3, there is shown a card comprising a transparent film base 20 having spaced parallel faces 21 and 22, the film base 20 being constructed of such a material so that at least the face 22 thereof has favorable pressure-sensitive characteristics.

As shown in the master form 10 of FIGURE 1, the card face is provided with index calibrations by means of which a code of information may be placed on the face of the card. Plural horizontal rows are established for effecting vertical coding of the card as is exemplified by the so-called zero row numbered at 23 and the successive numbered rows 1 through 9, respectively shown at 24.

The face of the card is also indexed via the master form 10 in vertical columns and in the specific illustration of FIGURE 1, eighty separate vertical index locations are shown at 26, thereby to effect horizontal coding of the card surface.

It may be noted, incidentally, that the minor area A includes the first twenty-six vertical index columns, while the major area B includes the vertical index columns running from 27 through 80, inclusive.

In accordance with the principles of the present invention, the major area B is divided into plural independent discrete image zones each shown at Z and being disposed in multiple columns extending vertically as at 27 and in multiple rows extending horizontally as at 28. In the exemplary embodiment illustrated herein, there are nine vertical columns 27 and four horizontal rows 28, thereby providing in the major area B thirty-six separate image zones. The separate image zones Z are spaced from one another to provide plural coding positions corresponding to the indexed calibrations disposed between the columns as shown at 29 and disposed between the rows as shown at 30. Accordingly, by virtue of the coding position locations, each image zone Z may be independently intelligence-coded within the body of the card which, in itself, may be intelligence-coded for general identification purposes in the minor area A.

Figure 4:
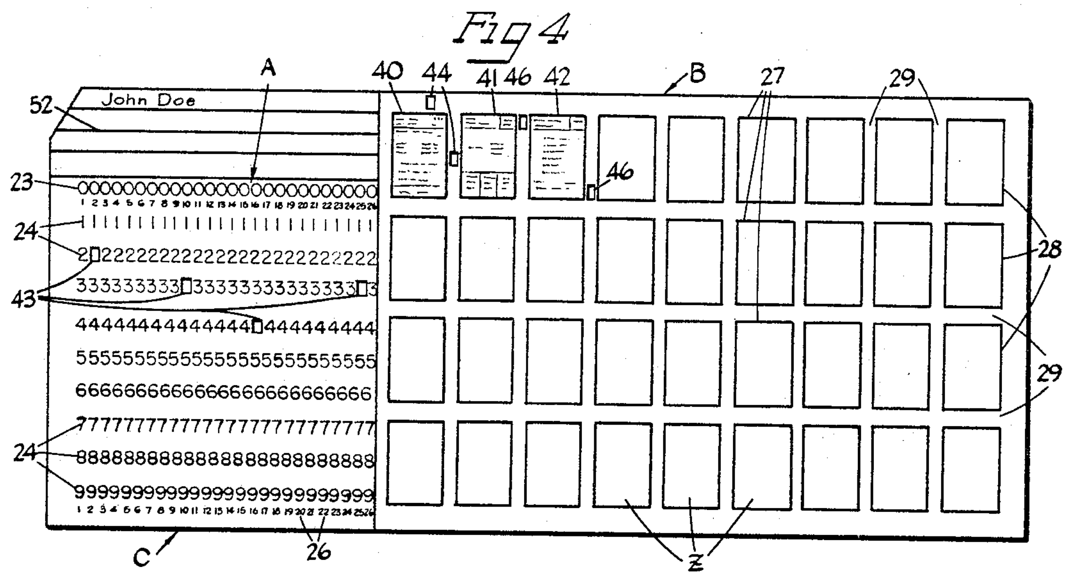
FIGURE 4 is a face view of a typical card constructed in accordance with the arrangements of FIGURES 2 or 3 and illustrating the condition of the card.
Figure 5:
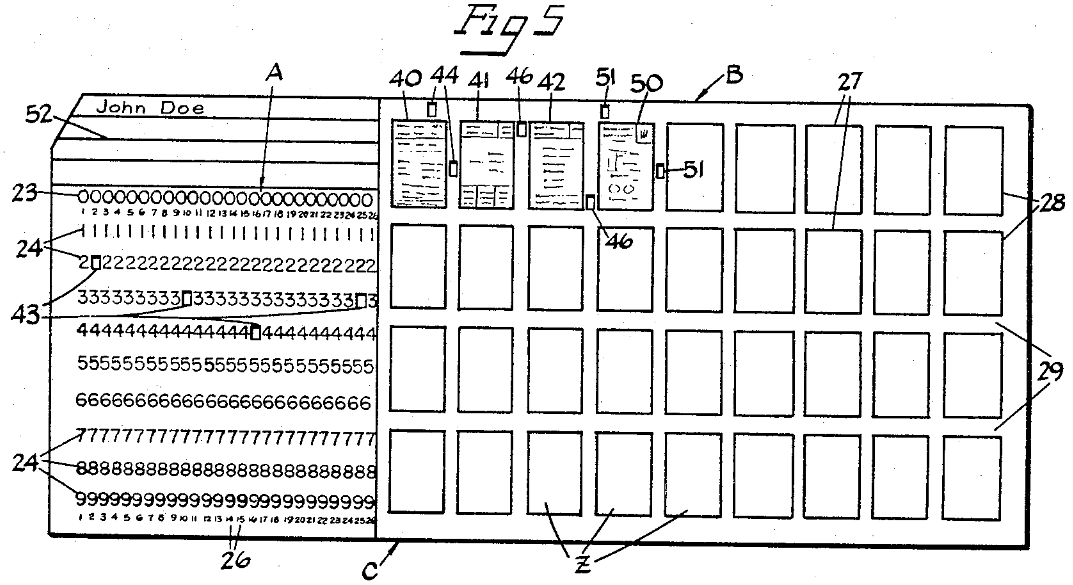
FIGURE 5 is a view similar to FIGURE 4 but showing the card after an additional image has been placed on the card and individually coded.

The image zones are located in alignment with the index calibrations prescribed by the horizontal and vertical index rows and columns. Further, although the exemplary card of FIGURES 4 and 5 shows four rows of zones Z, it is specifically contemplated by the present invention that the rows and columns of image zones could be aligned so the index calibration rows and columns would extend between the frames. For example, in a card having three rows of image zones Z, the rows of images would be centered on the "0," "4" and "8" lines, while the "No. 12" line (located above the "0" line) and the "No. 2" and "No. 6" lines would be reserved for intelligence coding to code each image zone independently.

In FIGURE 2, the pressure-sensitive coating 19 is shown with the image zones Z formed in the coating 19, while in FIGURE 3 the image zones Z are shown formed directly in the surface 22 of the film card.

In one form of the invention, a microimage is formed by optically reducing an image of information containing so-called document content to be stored onto a transfer medium. The image is rendered visible by a suitable image-forming medium having the required opaque characteristics so that the microimage may be transferred to the record card of the present invention.

A transfer process involving a discrete transferable image and a bonding surface of the type contemplated could be accomplished solely by pressure or by a combination of pressure plus a preconditioning of the bonding surface. For example, the pressure-sensitive coating, as indicated either at 19 in the species of FIGURE 2, or on the surface 22 in the species of FIGURE 3, may be presoftened, whereupon the image is transferred to the coating 19, or to the surface 22, thereby integrating the image on the surface of the record card.

In this connection, it may be noted that the entire area of the major area B may be presoftened, if desired, or, if preferable, a single localized image zone Z may be presoftened and the image transferred to the appropriate localized zone area. One acceptable technique is to locate the record card in a suitable indexed jig and confine a vapor solvent by means of a chamber shaped to expose a localized area at an indexed situs corresponding to one of the image zones Z, thereby presoftening only one of the desired image zones Z for transfer thereto of an appropriate microimage. Thus, either the coating 19 or the surface of the base material itself, such as the surface 22, is actually fused around the lines of the microimage and the image is made a permanent part of the record card. By placing the image on a transparent film base, the card can be utilized to produce enlarged blow-backs or full sized reproductions, or the card can be used in a reader which projects the image in enlarged visually perceptible form.

In FIGURES 4 and 5, the concepts of the present invention are shown applied to an information storage and retrieval system particularly adapted for utilization in the storage and retrieval of cumulative information, a type of information storage and retrieval which is characteristic of insurance companies.

Input to storage initially consists of an application file. Thus, the general identification of the insured would be punch-coded into the minor area A of a typical record card shown generally at C. Initially, the card is provided with three separate images shown at 40, 41 and 42, which images might correspond with the application, the record sheet and perhaps correspondence.

The intelligence codings of a general identification character are shown as punch codings indicated at 43 and it will be noted that the individual images 40, 41 and 42 are separately coded, image 40 being both horizontally and vertically punch-coded as at 44 and images 41 and 42 being horizontally punch-coded as at 46.

In the course of dealing with the record represented by the card C, the file may be pulled at various times for visual reference or for the purpose of effecting changes, making additions, or for developing abstracts. Thus, as shown in FIGURE 5, it is contemplated by the present invention that the card C may have added thereonto a new image 50. It will be understood that the working surface of the card would be presoftened and a microimage transferred onto the image zone to form a completed new image 50, thereby to store the newly accumulated information. Further, the image 50 could be coded either horizontally or vertically, or both, as shown at 51 completely independently of the code information already punched into the card in the coded information section A.

The minor area A may also be provided with an area shown at 52 suitable for accepting typed or printed heading information.

It will thus be appreciated, that as applied to an information storage and retrieval system for an insurance company, for example, the card C could have space thereon devoted to coded information such as the policy number, lapse date, number of cards and other data. Moreover, the card could accept visually legible heading information such as typing on the area 52 and would be transparent with positive images capable of projection in visible form or reproduction in enlarged copies, at least in the area B.

Further, the images 40, 41, 42, 50 may be cumulatively arranged in sequenced groups arranged by column and row and separated from one another by plural coding positions both in vertical and in horizontal direction to permit utilization of a horizontal coding system and a vertical coding system. For example, in the system illustrated utilizing five punch positions above each image and three punch positions alongside each image, thirty-one possible combinations or meanings per image are available. By dividing a standard sized business card into the proportions shown on the drawings, documents of a standard 9 x 12 may be reproduced with a reduction ratio of 20×.

The coded image permits requests by category, for example, claims, medical history, etc.

There is thus provided in accordance with the principles of the present invention a method of cumulating information on an accounting machine card by means of individual microimages disposed on localized areas arranged in a pattern of vertical columns and horizontal rows and separated from one another by plural punching positions.

In referring to the formation of an image, it should be understood there is no intent to limit this invention to the formation of an image by any particular technique.

Rather, it is contemplated that a visible relief image will be produced in accordance with any procedure capable of forming an image pattern in micro-lines corresponding to the original subject. The image should be sufficiently thick and of such a character that it will readily transfer for consolidation, bonding and fusion of the image material in and/or with the surface of the image zone Z. Further, when fused with the bonding surface, the image material should be shape-retaining in the sense that the transferred microimage is clear and reproducible and of good quality by microfilm standards.

It is contemplated by the present invention that the record card could comprise an opaque section A and a film section B. Thus, the opaque section could be made of any material having good punching characteristics and capable of having information typed or placed thereon. The film section B, as a second card made entirely of film, could then constitute a transparent film material sufficiently rigid to have good machinability, sufficiently strong to have good punchability and made of a material or coated with a material which is tackifiable or presoftenable in order to accept and retain a microimage thereon.

It will be recognized by those skilled in the art that the record card, or its film portion, can be constructed as a laminar member having a film base and a coating or as a single sheet form film member. In either event, either the surface presented by the coating or the film may take the form of a binder substance which, upon subjection to a conditioning influence such as exposure to heat or vapors, will soften to such an extent as to allow consolidation, bonding, or fusion between the micro-lines of an image and the surface.

When vapor tackification is used as a tackifying or softening influence, the particular vapor will depend on the particular image material and the particular surface layer of the record card. It will be recognized that the vapors used should not permanently impair the binder surface of the card, but should tackify or soften the surface sufficiently to receive and retain the image material.

Similarly, if heat is used as a softening influence, proper timing and temperature should be utilized to tackify or soften the image area sufficiently to accept and retain the image in bonded or fused relation with the binder surface.

Various solvent vapors which are available for use in this art include, by way of example, but not by way of limitation, trichloroethylene, chloroform, carbon tetrachloride, various chromatic solvents, various Freons (or fluorinated chloroalkanes), aromatic and aliphatic hydrocarbons such as benzene, toluene, gasoline and gasoline fractions, oxygenated solvents such as ethanol, acetone, ethylacetate and other alcohols, ketones, esters and the like.

The specific solvent selected will, of course, be matched to the particular combination of binder surface and image material used.

The amount of pressure necessary to accomplish transfer under the conditions contemplated will vary depending on such factors as the nature and condition of the presoftened or tackified binder surface, the image material and the timing. Generally, it has been observed that pressures in the order of about one to fifty pounds per lineal inch may be applied.

Further, while the method steps can be performed manually, automatic and semi-automatic devices can be readily used.

As used herein, the term "coding," as applied to identifiable areas or sensible coding stations, may refer either to the presence or the absence of a code signal in the identifiable area.

Those versed in the art will recognize that retrieval apparatus, for example, is able to sense the absence of an intelligence signal and meaning may be ascribed thereto.

Thus, bindary absence may be 0 or 1, while presence would be indicated by the digits 2–9.

Although minor modifications might be suggested by those versed in the art, it should be understood that I wish to embody within the scope of the patent warranted hereon all such modifications as reasonably and properly come within the scope of my contribution to the art.

I claim as my invention:

1. A coded record card of the type used in card classification systems comprising
a generally rectangular sheet form member forming a base,
one face of said card having a pressure sensitive bonding surface extending completely across said base and characterized by plural separated image zones for receiving and retaining image forming material by pressure transfer,
said image zones being disposed in multiple columns extending vertically and in multiple rows extending transversely,
said image zones each having coding positions adjacent thereto for effecting coding of the individual images formed on said face within the coded card.

2. A film record card comprising
a transparent film base in the configuration of a record card having longitudinal and transverse edges,
said card having a tackifiable image support surface on one side thereof extending completely across the film base between said edges and forming a working face on the card,
and visible image-forming medium on said surface arranged to form plural localized images disposed in vertical columns and horizontal rows,
each of said images being fused in said surface for consolidation in said tackifiable surface of said film base as a shape-retaining visible image.

3. A film record card as defined in claim 2, and identifiable positions forming intelligence means adjacent each image to code the images separately.

4. A film record card having a rectangular configuration including
top and bottom edges having
a major longitudinal dimension extending horizontally and
side edges having
a minor transverse dimension extending vertically,
said card having an information panel at one end thereof for intelligence-coded information,
the remaining portions of said card constituting a transparent film base having an image support bonding surface for forming plural localized image zones divided into vertical columns and horizontal rows,
said columns and rows being separated by punching positions,
said surface of said film base being made of a material sensitizable locally and extending across the entire face on one side of said film base to add visible opaque image medium for forming microimages in said zones selectively.

5. A unitized rectangular tab card comprising
a sheet form card member having longitudinal and transverse edges,
means forming a continuous surface extending across said card member between said edges and including
a minor area at one end of the major dimension of the card for containing punch information,
and a sensitized image surface constituting a major area extending completely over the remaining portions of the card,
said image surface having plural independent discrete image zones disposed in multiple columns on said image surface extending vertically and in multiple rows extending horizontally and on which said surface microlines in the form of a reduced image corresponding to document content may be placed, said card having plural coding positions on said image surface adjoining each column of image zones for effecting horizontal coding of the respective image zones, and further including coding positions on said image surface adjoining each row of image zones for effecting vertical coding of the respective image zones.

6. A coded film card comprising a transparent film base having an image support surface extending completely across said film base to form a working face on one side of said card, said working face being presoftenable locally, and visible opaque medium disposed in the form of plural microimages fused in said surface to form a utilitarian image in said working face and disposed in vertical columns and horizontal rows.

References Cited

UNITED STATES PATENTS

| | | | |
|---|---|---|---|
| 2,984,921 | 5/1961 | Herzig | 235—61.12 |
| 3,165,848 | 1/1965 | Langan | 235—61.12 |

MAYNARD R. WILBUR, *Primary Examiner.*

DARYL W. COOK, *Examiner.*

W. J. KOPACZ, *Assistant Examiner.*

Disclaimer 3,373,265.—*Louis A. Smitzer*, Chicago, Ill. INFORMATION STORAGE AND RETRIEVAL PROCESS AND CODED RECORD CARD THEREFOR. Patent dated Mar. 12, 1968. Disclaimer filed Mar. 3, 1971, by the assignee, *Bell & Howell Company*.

Hereby enters this disclaimer to claims 2 and 6 of said patent.

[*Official Gazette September 14, 1971.*]